Feb. 12, 1974  D. O. HANSON  3,792,094
APPARATUS AND PROCESS FOR PRODUCING METHYL MERCAPTAN
Filed Oct. 13, 1971
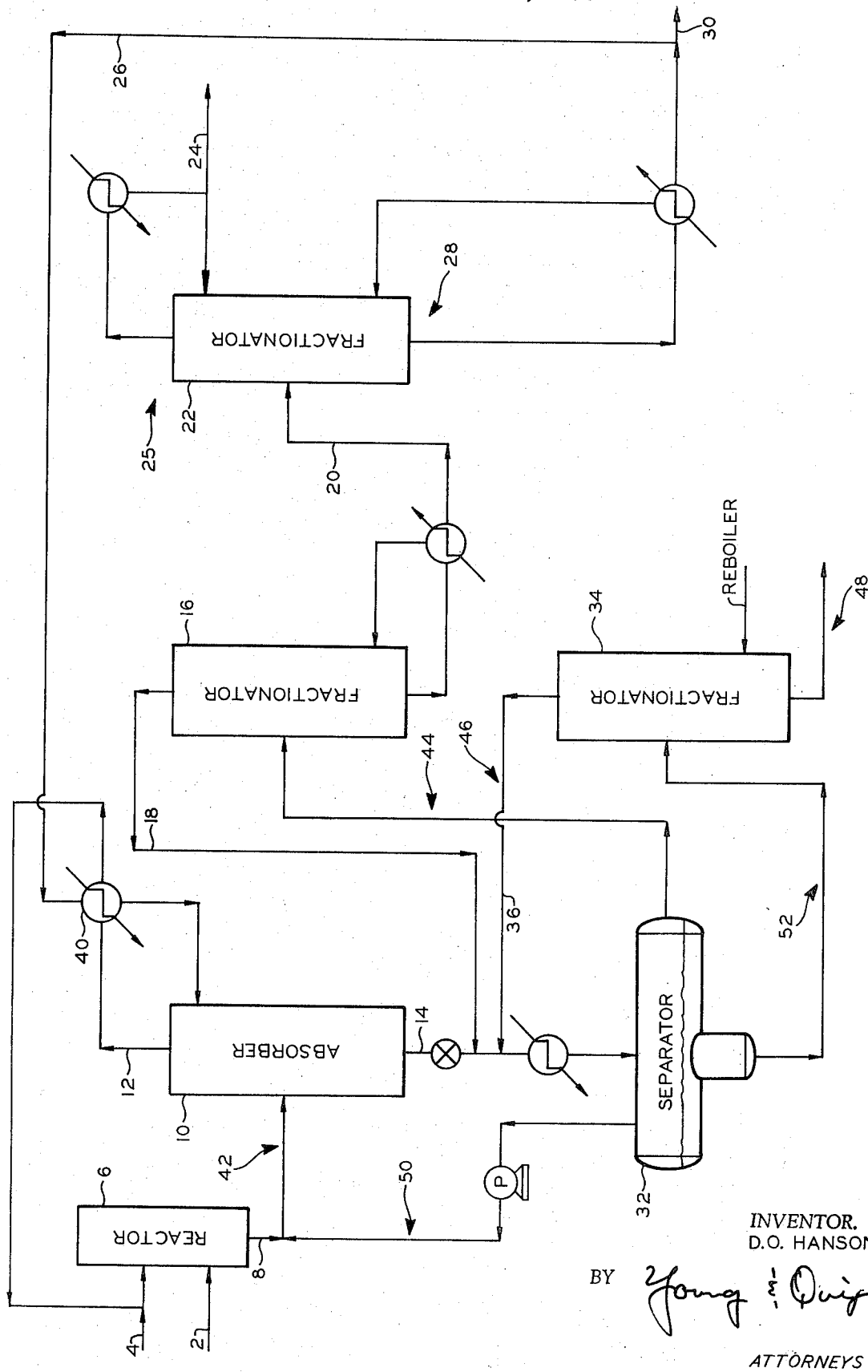
INVENTOR.
D.O. HANSON
BY Young & Quigg
ATTORNEYS

United States Patent Office 3,792,094
Patented Feb. 12, 1974

3,792,094
APPARATUS AND PROCESS FOR PRODUCING
METHYL MERCAPTAN
Donald O. Hanson, Bartlesville, Okla., assignor to Phillips
Petroleum Company, Bartlesville, Okla.
Filed Oct. 13, 1971, Ser. No. 188,724
Int. Cl. C07c 149/02
U.S. Cl. 260—609 R    6 Claims

ABSTRACT OF THE DISCLOSURE

A process for producing methyl mercaptan by reacting methanol and hydrogen sulfide to form a first stream, contacting the first stream with dimethyl sulfide for absorbing the methyl mercaptan and thereafter recovering the methyl mercaptan.

In the apparatus and process of producing methyl mercaptan by reacting methanol and hydrogen sulfide and thereafter fractionating of the resultant reaction effluent is frequently employed to recover methyl mercaptan from hydrogen sulfide for further processing and separation. When such fractionation steps are utilized, it is necessary to operate the fractionator at relatively high pressures in order to separate excess hydrogen sulfide from the first hydrocarbon or product stream. Sometimes extraneous solvents are utilized in an absorption step to effect this selective separation between hydrogen sulfide and methyl mercaptan. This adds extraneous components to the stream that must be subsequently separated which results in additional separation equipment and processing.

This invention therefore resides in an improvement of apparatus and method for producing methyl mercaptan from a reaction of methanol and hydrogen sulfide wherein a separated, recycled stream of dimethyl sulfide is passed to the absorber and brought into contact with a first hydrocarbon stream discharging from the reactor into the absorber for absorbing methyl mercaptan and other heavy components from excess hydrogen sulfide from the first hydrocarbon stream.

Other aspects, objects, and advantages of the present invention will become apparent from a study of the disclosure, the appended claims, and the accompanying drawing.

The drawing is a diagrammatic view of apparatus for forming methyl mercaptan from the methanol and hydrogen sulfide feed streams.

Referring to the drawing, a methanol stream 2 and a hydrogen sulfide stream 4 are supplied at controlled rates to a reactor 6. The reactor 6 can be for example a vessel containing a fixed bed of catalyst or the reaction can be carried out in a moving bed type operation employing either a granular or bead form of catalyst or in a fluid-bed type operation employing a finely comminuted catalyst.

Thorium oxide, supported or unsupported, is one of the suitable catalysts for the reaction, but other metallic oxide catalysts which are effective are the oxides of zirconium, titanium, uranium, tungsten, molybdenum, chromium, vanadium, manganese, zinc, cadmium, and aluminum. Although all the oxides of these metals are effective for the purposes of this invention, in cases where several oxides of a given metal exist, intermediate oxides between the lowest and highest oxide, whether well-defined oxides, consistent molar compounds, or mixtures of higher and lower oxides are preferred.

While the metallic oxides may be used per se, it is usually preferable to support them on a carrier such as activated alumina, bauxite, silica gel, pumice, carbon, or montmorillonite type clays. Activated alumina, silica and carbon are preferred for supports, especially the alumina since it has a minor degree of catalytic activity itself under the ordinary range of reaction conditions. Thoria is preferred for the more active component of the catalyst, but when indicated by better availability or economics oxides of the other metals listed may be substituted. Zirconia and titania are other oxides which are also favored.

A first stream 8 discharges from the reactor 6 and into an absorber 10. The absorber has an overhead product stream 12 and a bottoms stream 14 discharging therefrom. The absorber bottoms stream 14 is passed into a phase separator 32 wherein it separates into a water phase which settles to the bottom and exits as stream 52, an organic phase which "floats" on the water phase and exits as stream 44, and a gas phase which is recycled to the absorber feed as stream 50. The first fractionator 16 separates organic stream 44 into an overhead product vapor stream 18 and a dimethyl sulfide-methyl mercaptan stream 20 discharging therefrom. The dimethyl sulfide-methyl mercaptan stream 20 is passed into a second fractionator 22. The second fractionator 22 has a methyl mercaptan stream 24 discharging from an upper portion 25 of the second fractionator 22 which stream is recovered as product of the apparatus and method.

A recycle conduit 26 is connected at one end to a lower portion 28 of the second fractionator 22 and at the other end to the absorber 10 for recycling a dimethyl sulfide stream from the second fractionator 22, into the absorber 10 in contact with the first stream 8 for recycling dimethyl sulfide for absorbing the methyl mercaptan therein and forming the absorber bottoms stream 14. Excess dimethyl sulfide is removed from the system via pipe 30. Most of this is preferably recycled to reactor 6 for the purpose of supressing the formation of additional dimethyl sulfide. The various streams set forth above are passed through conduits connecting the various elements of the apparatus.

The fractionators 16 and 22 are known in the art and can be for example vertical, cylindrical vessels containing bubble-cap or sieve-type trays. Absorber 10 is a similar vessel and may contain trays or packing.

As shown in the drawing, the phase separator 32 and associated third fractionator 34 is associated with the absorber bottoms stream 14 for removing water from said stream prior to passing of said stream 14 into the first fractionator 16. In the third fractionator 34, a stream 36 containing primarily water with smaller amounts of methanol and other hydrocarbons, as later more fully described, can be recycled to the phase separator 32 for subsequent recovery of the valuable product. Hydrogen sulfide remaining in the absorber bottoms stream can also be separated in the phase separator 32 and returned to the system upstream of the absorber 10, for example. By this method and apparatus, water is separated prior to the first fractionation and valuable hydrogen sulfide and methanol streams are separated and recycled for use in the system with subsequent ultimate recovery. The separated excess hydrogen sulfide stream 12 discharging from the absorber 10 is likewise recycled to the reactor 6 for product production.

The recycling dimethyl sulfide stream passing through the recycle conduit 26 is preferably conditioned for more efficient absorption of the methyl mercaptan prior to injecting the stream into the absorber. For this purpose, a heat exchanger 40 is associated with the recycle conduit for changing the temperature of the dimethyl sulfide stream passing therethrough. It is preferred that the temperature of the dimethyl sulfide stream passing into the absorber 10 be in the range of about 100 to about 140° F. The overhead product stream 12 discharging from the upper portion of the absorber 10 can be associated with the heat exchanger 40 for maintaining the dimethyl sulfide stream of the recycle conduit 26 in the desired temperature range. A water cooled exchanger may be used.

By so providing the separated dimethyl sulfide stream to the absorber 10 as the absorbent utilized therein and preferably as the only absorbent utilized therein, the pressure of the accumulator can be maintained at a relatively low value, for example in the range of about 300 to 700 p.s.i. Since the dimethyl sulfide stream is a by-product of the process and is necessarily separated and recovered in the process, absorbent components which require additional separation are avoided and the purchase, labor, and materials necessary for the maintenance of other absorbents are avoided.

The following is a table setting forth typical components which make up the streams at various locations in the process.

In addition, no extraneous selective solvents need be added to the system with attendant separation and recovery system. Because dimethyl sulfide is a by-product of the process, it must be fractionated from the other reaction products in any product recovery scheme so the second fractionator in the invention is not an extra fractionation step. It would be required even if dimethyl sulfide were not used as absorption oil.

Other modifications and alterations of this invention will become apparent to those skilled in the art from the foregoing discussion, example, and accompanying drawing, and it should be understood that this invention is not to be unduly limited thereto.

What is claimed is:

1. In a process for producing methyl mercaptan by reacting methanol and hydrogen sulfide to form a first stream containing methyl mercaptan and recovering the methyl mercaptan, the improvement comprising:

contacting the first stream with dimethyl sulfide for absorbing the methyl mercaptan, said dimethyl sulfide contacting the first stream being at a temperature in the range of about 100 to about 140° F. and said first stream and dimethyl sulfide being maintained at a pressure in the range of about 300 to about 700 p.s.i.g. during contacting.

2. A process for producing methyl mercaptan, comprising:

reacting a methanol stream with a hydrogen sulfide stream in a reaction zone and forming a first stream comprising methyl mercaptan and hydrogen sulfide;

contacting the first stream with dimethyl sulfide in an absorption zone for absorbing the methyl mercaptan and forming a second stream and a hydrogen sulfide stream, said dimethyl sulfide contacting the first stream being at a temperature in the range of about 100 to about 140° F. and said first stream and dimethyl sulfide being maintained at a pressure in the range of about 300 to about 700 p.s.i.g. during contacting;

TABLE

| | Location number | | | | | | |
|---|---|---|---|---|---|---|---|
| | 8 | 12 | 18 | 20 | 24 | 26 | 30 |
| Location description | Reactor effluent | Absorber vapor product | First fractionator (16) overhead vapor | Bottoms first fractionator | methyl mercaptan product from second fractionator | Dimethyl sulfide absorption oil | Dimethyl sulfide for recycle to reactor and surplus |
| Components, lb. moles/hour: | | | | | | | |
| Hydrogen | 2.900 | 2.900 | .020 | | | | |
| Nitrogen | | | | | | | |
| Methane | 3.000 | 3.000 | .140 | | | | |
| Carbon dioxide | 18.630 | 18.630 | 4.280 | | | | |
| Hydrogen sulfide | 69.400 | 69.400 | 58.460 | | | | |
| Carbonyl sulfide | 5.010 | 5.010 | 4.610 | | | | |
| Propylene-propane | 6.730 | 6.730 | 18.400 | | | | |
| Dimethyl ether | 1.000 | .970 | 7.620 | .030 | .030 | | |
| Methyl mercaptan | 21.400 | .200 | 10.200 | 21.320 | 20.994 | .030 | 0.206 |
| Dimethyl sulfide | 44.727 | .400 | 7.210 | 58.317 | .030 | 13.990 | 44.297 |
| Propyl mercaptan | 17.973 | .160 | 2.000 | 26.343 | | 8.530 | 17.813 |
| Methanol | 4.000 | .020 | .230 | 6.430 | | 2.450 | 3.980 |
| Water | 23.278 | .020 | 1.730 | 2.750 | .367 | | 2.383 |

| | Location number | | | | | |
|---|---|---|---|---|---|---|
| | 42 | 44 | 46 | 48 | 50 | 52 |
| Location description | Total absorber feed | Organic phase feed to first fractionator | Third fractionator overhead vapor | Third fractionator bottoms product | Recycle vapor | Water phase feed to third fractionator |
| Components, moles/hour: | | | | | | |
| Hydrogen | 3.030 | .020 | | | .130 | |
| Nitrogen | | | | | | |
| Methane | 3.230 | .140 | | | .230 | |
| Carbon dioxide | 21.450 | 4.280 | | | 2.820 | |
| Hydrogen sulfide | 86.750 | 58.460 | .287 | | 17.350 | .287 |
| Carbonyl sulfide | 6.270 | 4.610 | | | 1.260 | |
| Propylene-propane | 10.080 | 18.400 | | | 3.350 | |
| Dimethyl ether | 1.820 | 7.650 | | | .820 | |
| Methyl mercaptan | 22.790 | 31.430 | .134 | | 1.390 | .134 |
| Dimethyl sulfide | 45.877 | 65.527 | .373 | | 1.150 | .373 |
| Propyl mercaptan | 18.293 | 28.343 | .167 | | .320 | .167 |
| Methanol | 4.030 | 6.660 | 6.427 | .020 | .030 | 6.447 |
| Water | 23.528 | 4.480 | 13.704 | 52.888 | .250 | 36.592 |

NOTE.—See the following table:

Operating Conditions

Reactor:
Temperature _____ 750° F.
Pressure _____ 550 p.s.i.g.
Space velocity _____ 0.4/ vol./hr./vol. of catalyst.
Ratio methanol/H₂S _____ 4:1 lb./lb.
Absorber:
Temperature:
Top _____ 140° F.
Bottom _____ 300° F.
Feed _____ 460° F.
Pressure _____ 500 p.s.i.g.

A study of the table and the accompanying drawing of an example process and apparatus for providing methyl mercaptan from a reaction of methanol and hydrogen sulfide containing the improvement of this invention shows the effective and efficient separations achieved while maintaining the absorber at a pressure less than about 700 p.s.i. as opposed to the much higher pressures in the heretofore utilized methods and apparatus. In the instant example, the absorber was maintained at about 500 p.s.i. At pressures greater than about 700 p.s.i. there is a waste of material, equipment, and labor for providing and maintaining equipment necessary to withstand the greater pressures.

recycling the hydrogen sulfide stream from the absorption zone to the reaction zones;
separating the second stream in a separating zone into a water phase, an organic phase, and a gas phase;
recycling the gas phase to the absorption zone;
fractionating the organic phase in a first fractionating zone to form an overhead vapor stream and a dimethyl sulfide-methyl mercaptan stream;
recycling the overhead vapor stream from the first fractionating zone to the separating zone;
fractionating the dimethyl sulfide-methyl mercaptan stream in a second fractionating zone to form a methyl mercaptan stream and a dimethyl sulfide stream;
recovering the dimethyl sulfide stream; and
recycling at least a portion of the dimethyl sulfide stream from the second fractionating zone to the absorption zone.

3. A process, as set forth in claim 2, including fractionating the water phase from the separating zone in a third fractionating zone for recovering hydrocarbons from the water phase and recycling the recovered hydrocarbons from the third fractionating zone to the separating zone.

4. A process, as set forth in claim 2, including heating the dimethyl sulfide-methyl mercaptan stream passing from the first fractionating zone to the second fractionating zone.

5. A process, as set forth in claim 2, including cooling the fluids entering the separating zone.

6. A process, as set forth in claim 2, including fractionating the water phase from the separating zone in a third fractionating zone for recovering hydrocarbons from the water phase;
recycling the recovered hydrocarbons from the third fractionating zone to the separating zone;
maintaining the temperature of the dimethyl sulfide stream passing into the absorption zone from the second fractionating zone at a temperature in the range of about 100 to about 140° F.;
maintaining the pressure in the absorption zone at a pressure in the range of about 300 to about 700 p.s.i.g.;
heating the dimethyl sulfide-methyl mercaptan stream passing from the first fractionating zone to the second fractionating zone; and
cooling the fluids entering the separating zone.

References Cited

UNITED STATES PATENTS

| | | | |
|---|---|---|---|
| Re. 24,796 | 3/1960 | Bell et al. | 260—609 R |
| 2,807,649 | 9/1957 | Henning et al. | 260—609 R |

LEWIS GOTTS, Primary Examiner

D. R. PHILLIPS, Assistant Examiner

U.S. Cl. X.R.

23—260